(12) United States Patent
Kawahata

(10) Patent No.: US 7,302,189 B2
(45) Date of Patent: Nov. 27, 2007

(54) OPTICAL COMPONENT PROVIDED WITH DEMULTIPLEXING FUNCTION AND WAVELENGTH DISPERSION COMPENSATOR

(75) Inventor: Yuichi Kawahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 10/790,356

(22) Filed: Mar. 2, 2004

(65) Prior Publication Data
US 2005/0041973 A1    Feb. 24, 2005

(30) Foreign Application Priority Data
Aug. 22, 2003    (JP) .............................. 2003-298239

(51) Int. Cl.
  H04B 10/18    (2006.01)
  H04J 14/02    (2006.01)
(52) U.S. Cl. .................. 398/147; 398/81; 398/158; 398/159; 398/150; 385/15; 385/24; 385/31; 385/37; 359/577; 359/578; 359/580; 359/615
(58) Field of Classification Search ............... 398/81, 398/147–150, 208; 359/577–615; 385/31–38
See application file for complete search history.

(56) References Cited

U.S. PATENT DOCUMENTS

| | | | |
|---|---|---|---|
| 5,930,045 A | 7/1999 | Shirasaki | |
| 5,999,320 A | 12/1999 | Shirasaki | |
| 6,304,382 B1 * | 10/2001 | Shirasaki et al. | 359/577 |
| 6,392,807 B1 * | 5/2002 | Barbarossa et al. | 359/578 |
| 7,099,531 B2 * | 8/2006 | Chen et al. | 385/31 |
| 2003/0081318 A1 | 5/2003 | Shirasaki et al. | |
| 2003/0215182 A1 * | 11/2003 | Lin et al. | 385/37 |
| 2005/0041921 A1 * | 2/2005 | Okada et al. | 385/31 |

FOREIGN PATENT DOCUMENTS

| | | |
|---|---|---|
| JP | 09-043057 | 2/1997 |
| JP | 2000-511655 | 9/2000 |
| JP | 2001-313607 | 9/2001 |

OTHER PUBLICATIONS

M. Shirasaki, et al., "Virtually Imaged Phased Array With Graded Reflectivity," IEEE Photonics Technology Letters, vol. 11, No. 11, Nov. 1999 (pp. 1443-1445).
EP Search Report for corresponding EP Application EP 04004197.2 dated Apr. 1, 2005.

* cited by examiner

*Primary Examiner*—Kenneth Vanderpuye
*Assistant Examiner*—Li Liu
(74) *Attorney, Agent, or Firm*—Staas & Halsey LLP

(57) ABSTRACT

It is an object of the present invention to provide an optical component provided with a demultiplexing function capable of reducing an insertion loss and downsizing, and a wavelength dispersion compensator using such an optical component. In order to achieve the object, according to the optical component provided with the demultiplexing function of the present invention, in a configuration of VIPA type in which an incident light is multiple-reflected between two reflective surfaces that are opposed and parallel to each other, and due to the mutual interference of the multiple-reflected light, optical beams, traveling direction of which are different from each other according to wavelengths, are formed, an incident light is given from a first side surface substantially perpendicular to the reflective surfaces, and is reflected by a second side surface opposed to the first side surface, to be sent to either of the parallel reflective surfaces, thereby causing the multiple-reflection between the reflective surfaces.

10 Claims, 12 Drawing Sheets

TOP VIEW x'-x' CROSS SECTION VIEW y'-y' CROSS SECTION VIEW

RELATED ART

OPTICAL COMPONENT PROVIDED WITH DEMULTIPLEXING FUNCTION AND WAVELENGTH DISPERSION COMPENSATOR

BACKGROUND OF THE INVENTION

1. Field of the Invention

The present invention relates to an optical component provided with a function for demultiplexing a wavelength division multiplexed (WDM) light according to wavelengths, and a wavelength dispersion compensator using such an optical component, in the field of optical communications.

2. Description of the Related Art

There have been proposed various optical apparatuses utilizing so-called a virtually imaged phased array (VIPA) for demultiplexing a WDM light into a plurality of optical beams that can be distinguished spatially according to wavelengths, as a conventional optical component provided with a demultiplexing function (refer to Japanese Unexamined Patent Publication No. 9-43057 and Japanese National Publication No. 2000-511655).

FIG. 10 is a perspective view showing a configuration example of a conventional VIPA-type wavelength dispersion compensator. Further, FIG. 11 is a top view of the configuration example of FIG. 10.

As shown in each figure, in the conventional VIPA-type wavelength dispersion compensator, a WDM light emitted from one end of an optical fiber 130 via an optical circulator 120 is converted into a parallel light by a collimator lens 140 and, then, condensed on one segment by a line focal lens 150 and passes through a radiation window 116 of a VIPA plate 110 to be input between opposed parallel planes. The incident light on the VIPA plate 110 is multiple reflected repeatedly, for example, between a reflective multilayer film 112 formed on one plane of the VIPA plate 110 and having the reflectance lower than 100% and a reflective multilayer film 114 formed on the other plane and having the reflectance of substantially 100%. At this time, every time the incident light is reflected on the surface of the reflective multilayer film 112, a few % of the light is transmitted through the surface to be emitted outside the VIPA plate 110. Note, an optical axis of the light incident on the VIPA plate 110 is tilted from an angle of vertical incidence to the VIPA plate 110, by a required angle.

The lights transmitted through the VIPA plate 110 interfere mutually and generate a plurality of optical beams, traveling directions of which are different from each other, according to wavelengths. As a result, if each of the optical beams is condensed to one point by a convergent lens 160, each condensed position moves on a straight line according to variation of the wavelengths. By disposing, for example, a free-form surface mirror 170 on the straight line, the lights that have been emitted from the VIPA plate 110 and condensed by the convergent lens 160 are reflected at different positions on the free-form surface mirror 170 according to respective wavelengths to be returned to the VIPA plate 110. Since the lights reflected on the free-form surface mirror 170 are propagated through an optical path in a direction exactly opposite to that of the optical path through which the lights have been propagated previously, different wavelength components are propagated for different distances and, therefore, the wavelength dispersion of the WDM light is compensated.

In consideration of a model as shown in FIG. 12, for example, behavior of the light that is multiple-reflected by the VIPA plate 110 as described above is similar to that in an Echelon grating that is a well-known step-wise diffraction grating. Therefore, the VIPA plate 110 can be considered as a virtual diffraction grating. Further, in consideration of an interference condition in the VIPA plate 110 based on a model as shown in FIG. 13, for example, the emitted light interferes under a condition in which with an optical axis thereof as a reference, a shorter wavelength is above and a longer wavelength is below the optical axis, and therefore, among a plurality of optical signals contained in the WDM light, optical signals on the shorter wavelength side are output above the optical axis and optical signals on the longer wavelength side are output below the optical axis.

In this connection, in an optical system using the VIPA plate 110 as described above, four principal factors to cause an insertion loss of modules can be pointed out as follows:

(1) HR/AR edge loss;
(2) etalon transmission loss;
(3) other mode loss; and
(4) mode coupling loss.

More specifically, describing each loss (1)-(4) with reference to FIG. 14, the HR/AR edge loss of (1) occurs when the light reflected by the reflective multilayer film 112 of the VIPA plate 110 reaches a boundary (the HR/AR edge) between the radiation window 116 and the reflective multilayer film 114 on the opposite plane. Further, the etalon transmission loss of (2) is a loss of transmitted light depending on a material or the like of the VIPA plate 110. The other mode loss of (3) occurs due to the light of another order (±1st order in FIG. 14) than a previously set order (the fundamental order) among the lights that have been multiple-reflected in the VIPA plate 110 and have interfered mutually. The mode coupling loss of (4) corresponds to a region where an intensity distribution $I_1$ of a coherent light output from the VIPA plate 110 and an intensity distribution $I_2$ of a coherent light returned to the VIPA plate 110 overlap with each other shown at about the middle of FIG. 14.

It has been known that, among the loss factors described above, a trade-off relationship is established between the HR/AR edge loss and the other mode loss according to a condensing condition of the WDM light incident on the VIPA plate 110. Namely, as shown in FIG. 14 above, if a beam waist 2ω0 of the beam incident through the radiation window 116 of the VIPA plate 110 to be condensed on the segment in the vicinity of the reflective multilayer film 112 is narrowed, the HR/AR edge loss is reduced, but other mode loss is increased since a divergence angle θ bo of the output beam is increased. On the other hand, as shown in FIG. 15, if the beam waist 2ω0 of the condensed beam is thickened, other mode loss is reduced since the divergence angle θ bo of the output beam is reduced, but the HR/AR edge loss is increased. Therefore, in the optical system using the conventional VIPA plate 110, there is a problem in that the reduction of insertion loss is restricted.

Further, as the conventional VIPA-type wavelength dispersion compensator as shown in FIG. 10 described above, an optical system in which each optical component is arranged in a substantially straight line, is used. As a result, there is also a drawback in that the size of the compensator in a longitudinal direction becomes relatively large and it is difficult to downsize the compensator.

SUMMARY OF THE INVENTION

The present invention has been accomplished in view of the above problems and has an object to provide an optical component provided with a demultiplexing function capable of reducing an insertion loss and downsizing, and a wavelength dispersion compensator using such an optical component.

In order to achieve the above object, an optical component provided with a demultiplexing function according to the present invention, includes a device having two reflective surfaces which are opposed and parallel to each other, in which a light condensed in the one-dimensional direction is incident between the reflective surfaces of the device, and a part of the incident light is transmitted through one of the reflective surfaces while the incident light being multiple-reflected on the reflective surfaces, to be emitted, and the emitted light interferes mutually, so that optical beams traveling directions of which are different from each other according to wavelengths are formed. Then, the device of the optical component includes: a first side surface substantially perpendicular to each of the reflective surfaces; and a second side surface opposed to the first side surface and tilted relative to a perpendicular direction of the respective reflective surfaces, wherein the incident light is transmitted through the first side surface and, then, passes between the reflective surfaces to be reflected by the second side surface, and the light reflected by the second side surface is multiple-reflected on the reflective surfaces.

In the optical component of such configuration, the incident light is given to the device having the parallel reflective surfaces that multiple-reflect the incident light, from the first side surface substantially perpendicular to each reflective surface, and then, the incident light passes between the reflective surfaces and is supplied to the opposing second side surface to be reflected thereon. The light reflected by the second side surface is sent to either of the parallel reflective surfaces according to the inclination of the second side surface relative to the perpendicular direction of the parallel reflective surfaces. Thereafter, the light is multiple-reflected repeatedly between the reflective surfaces, and the multiple-reflected light that has been transmitted through one of the reflective surfaces interferes mutually, so that the optical beams the traveling directions of which are different from each other according to wavelengths are formed. In this manner, since the incident light is give to the first side surface of the device, an HR/AR edge loss as in the conventional technique can be prevented from occurring irrespective of the condensing condition of the incident light. Thus, it becomes possible to optimize the condensing condition of the incident light so that other mode loss is reduced. Further, since the incident light is give from the side surface of the device, it becomes also possible to downsize the optical component.

One aspect of a wavelength dispersion compensator according to the present invention comprises: an optical component provided with a demultiplexing function, which is configured as described above; and a reflector reflecting optical beams of respective wavelengths emitted from one of the reflective surfaces of the optical component in different directions to return the optical beams to the optical component, respectively. According to such a configuration, it becomes possible to provide a wavelength dispersion compensator that realizes the reduction of an insertion loss and downsizing.

Further, another aspect of a wavelength dispersion compensator according to the present invention, comprises: an optical component provided with a demultiplexing including a device having two reflective surfaces which are opposed and parallel to each other, in which a light condensed in the one-dimensional direction is incident between the reflective surfaces of the device, and a part of the incident light is transmitted through one of the reflective surfaces while the incident light being multiple-reflected on the reflective surfaces, to be emitted, and the emitted light interferes mutually, so that optical beams traveling directions of which are different from each other according to wavelengths are formed; and a reflector reflecting optical beams of respective wavelengths emitted from one of the reflective surfaces of the optical component in different directions to return the optical beams to the optical component, respectively, wherein a reflection prism for changing a propagation direction of light to an opposite direction is provided on an optical path between one of the reflective surfaces of the optical component and the reflector.

According to such a configuration, since the optical path between the one of the reflective surfaces of the optical component and the reflector is turned back with the reflection prism, a size of the wavelength dispersion compensator in a longitudinal direction is reduced.

The other objects, features and advantages of the present invention will be apparent from the following description of the embodiments with reference to the accompanying drawings.

DETAILED DESCRIPTION OF THE INVENTION

Figure 1:
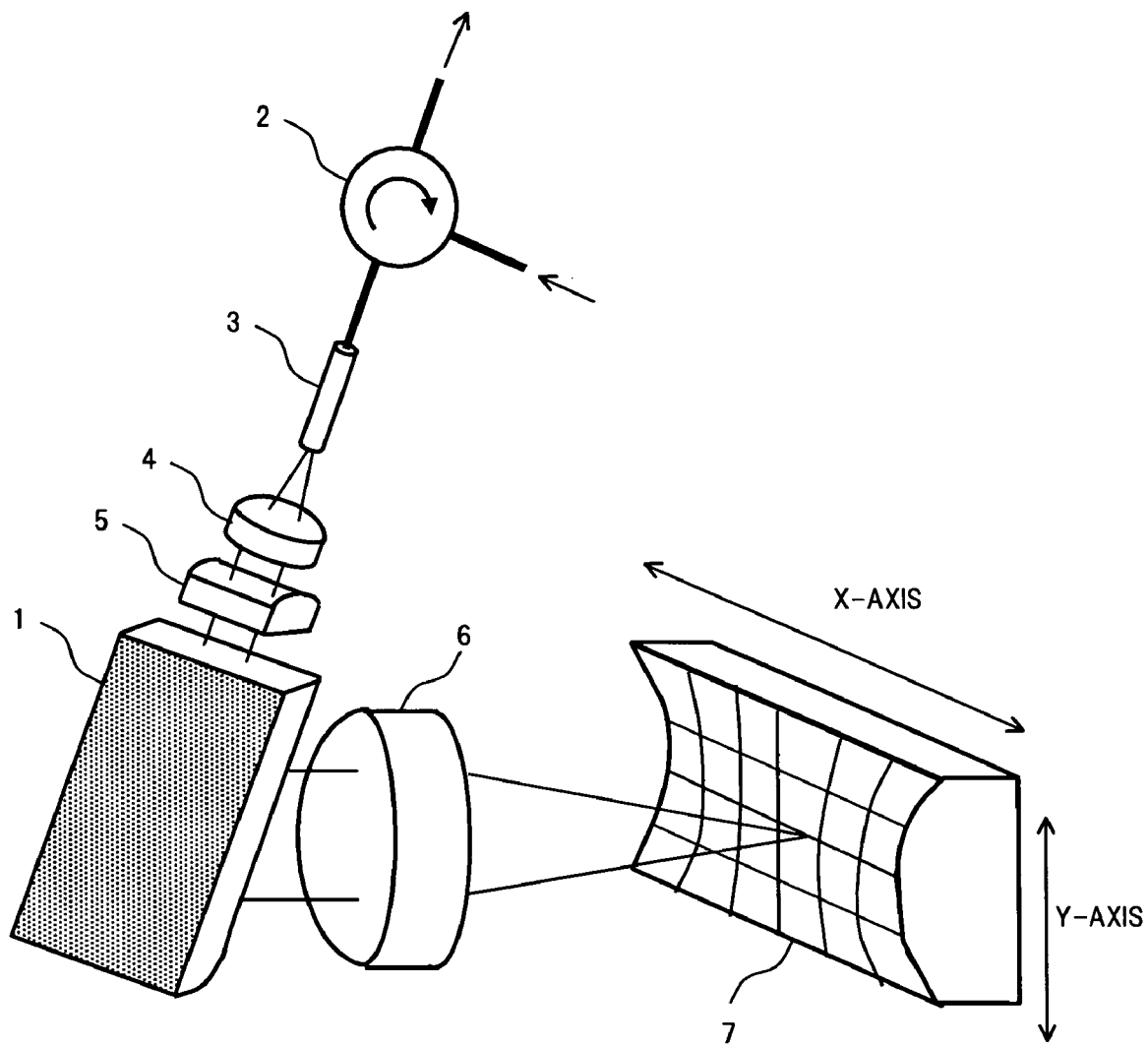
FIG. 1 is a perspective view showing an entire configuration of a first embodiment of the present invention.

Hereinafter, embodiments of the present invention will be described with reference to drawings. In this description, same reference numerals denote same or corresponding parts throughout all figures.

FIG. 1 is a perspective view showing an entire configuration of a first embodiment of a wavelength dispersion compensator according to the present invention.

In FIG. 1, the wavelength dispersion compensator of the first embodiment comprises, for example: a VIPA plate 1 as a device having two reflective surfaces which are opposed and parallel to each other; an optical circulator 2, an optical fiber 3, a collimate lens 4 and a line focal lens 5, which serve as a first optical system enabling a WDM light condensed on a segment to be incident on a first side surface substantially perpendicular to the parallel planes, on which reflective multiplayer films are formed, of the VIPA plate 1; a convergent lens 6 serving as a second optical system, condensing an optical beam that has been multiple-reflected by the VIPA plate 1 to be emitted from one of the planes, on one point; and a free-form surface mirror 7 serving as a reflector, for reflecting the light condensed by the convergent lens 6 at a required position to return the light to the VIPA plate 1 via the convergent lens 6.

Figure 2:
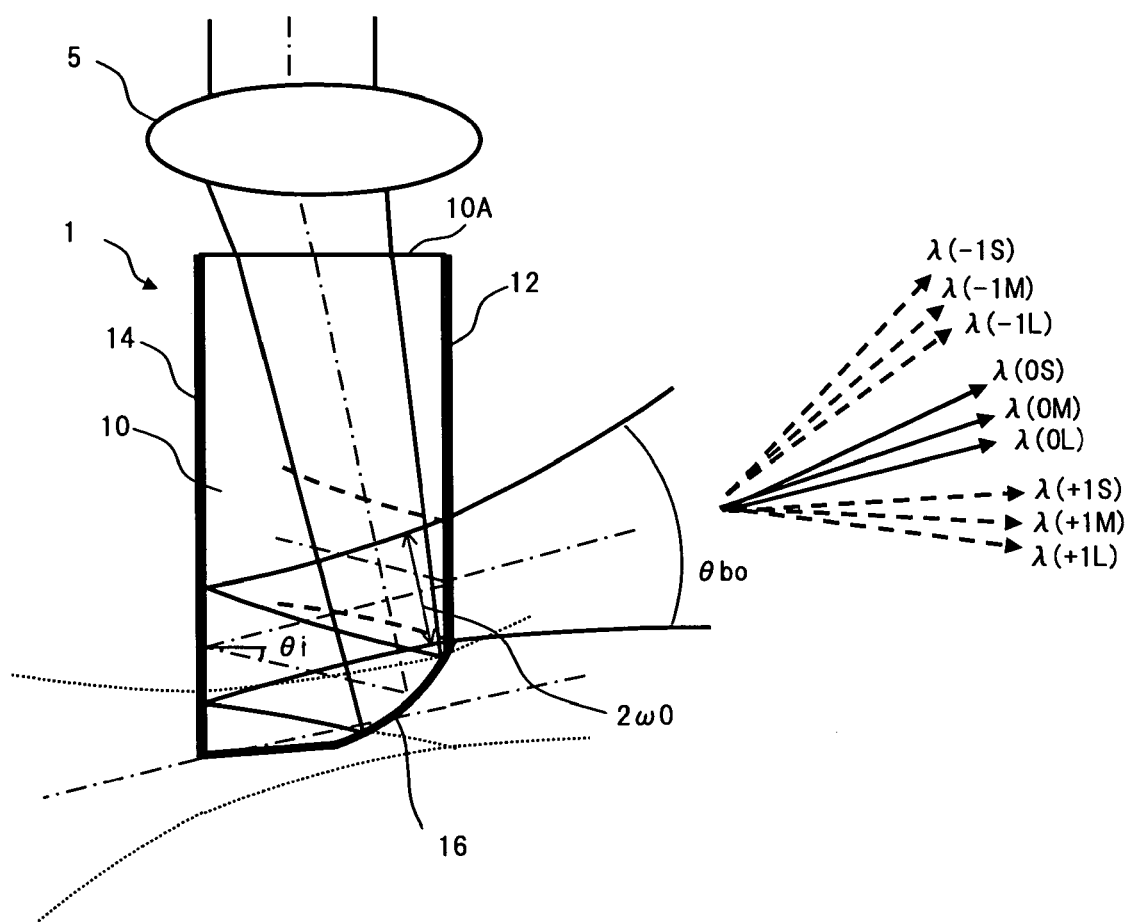
FIG. 2 is a side cross section view showing a configuration around a VIPA plate in FIG. 1 in an enlarged manner.

As shown in a side cross section view of FIG. 2, for example, the VIPA plate 1 includes a glass plate 10 provided with parallel planes opposed to each other (left and right surfaces in FIG. 2), reflective multilayer films 12 and 14 formed respectively on the parallel planes of the glass plate 10, and a concave cylindrical mirror portion 16 formed so as to be tilted relative to a perpendicular direction of the parallel planes. The glass plate 10 has a first side surface 10A (a top surface in FIG. 2) substantially perpendicular to the parallel planes on which the reflective multilayer films 12 and 14 are formed. The WDM light condensed by the line focal lens 5 disposed above the side surface 10A is given between the parallel planes from the side surface 10A.

The reflective multilayer film 12 has the reflectance lower than 100% (preferably about 95-98%) with respect to the WDM light incident from the side surface 10A and is formed on the entirety of one of the planes (the right plane in FIG. 2) of the glass plate 10. On the other hand, the reflective multilayer film 14 has the reflectance of substantially 100% with respect to the WDM light incident from the side surface 10A and is formed on the entirety of the other of the planes (the left plane in FIG. 2) of the glass plate 10.

The concave cylindrical mirror portion 16 is formed such that, for example, a second side surface (a bottom face in FIG. 2) opposed to the side surface 10A of the glass plate 10 is formed into a cylindrical concave surface partially or as a whole, and then, a reflective multilayer film having the reflectance of substantially 100% is formed on the formed surface. Note, although the concave cylindrical mirror is formed on the second side surface here, the shape of the second side surface is not limited to that described here and, for example, a flat plate mirror tilted relative to the perpendicular direction of the parallel planes may be formed on the second side surface. Further, although the example is shown in which the concave cylindrical mirror portion 16 is tilted relative to the perpendicular direction of the parallel planes so that the light incident on the concave cylindrical mirror portion 16 passing through the side surface 10A is reflected toward the reflective multilayer film 14 as described below, the concave cylindrical mirror portion 16 may be tilted so that the incident light is reflected toward the reflective multilayer film 12.

The optical circulator 2 is a typical optical component including three ports, for example, and transmitting a light in directions from a first port to a second port, from the second port to a third port and from the third port to the first port. Here, the WDM light input to the present wavelength dispersion compensator is given to the first port of the optical circulator 2 and sent to one end of the optical fiber 3 via the second port, while the WDM light returned to the other end of the optical fiber 3 is output from the third port via the second port as an output light of the present wavelength dispersion compensator.

The optical fiber 3 is, for example, a single-mode optical fiber and the like, one end thereof being connected with the second port of the optical circulator 2 and the other end being arranged in the vicinity of the collimate lens 4. Note, the type of the optical fiber 3 is not limited to that described above.

The collimate lens 4 is a typical lens converting an optical beam emitted from the other end of the optical fiber 3 into a parallel light to supply it to the line focal lens 5.

The line focal lens 5 condenses the parallel light from the collimate lens 4 on one segment and, more specifically, it may be a cylindrical lens, a gradient index lens or the like.

The convergent lens 6 is a typical lens condensing on one point, a plurality of optical beams that are multiple-reflected by the VIPA plate 1 to be emitted from the side of the reflective multilayer film 12, and interfere mutually so that traveling directions of which are different for every wavelengths.

The free-form surface mirror 7 has, for example, a three-dimensional structure in which the surface thereof is aspheric, and there is a central axis acting as a design reference on the aspheric mirror. This free-form surface mirror 7 is attached to a movable stage (not shown) and arranged so that a traveling axis of the movable stage is parallel to respective directions of the central axis (in an X-axis direction in FIG. 1). By moving the free-form surface mirror 7 by the movable stage, an amount of compensation in this wavelength dispersion compensator can be adjusted.

Next, an operation of the wavelength dispersion compensator of the first embodiment will be described.

In the wavelength dispersion compensator of such a configuration described above, the WDM light input to the first port of the optical circulator 2 is sent to the optical fiber 3 via the second port. The WDM light emitted from the optical fiber 3 is converted into a parallel light by the collimate lens 4 and, then, condensed on one segment by the line focal lens 5.

More specifically, as shown by solid curves in FIG. 2 described above, the light transmitted through the line focal lens 5 is incident onto the inside of the VIPA plate 10 from the side surface 10A, and passes between the parallel planes on which the reflective multilayer films 12 and 14 are formed, to reach the concave cylindrical mirror portion 16. Then, the light incident on the concave cylindrical mirror portion 16 is reflected toward the reflective multilayer film 14, to be given at an incident angle of θi to the parallel planes having the reflectance of substantially 100% and, thereafter, multiple-reflected between the parallel planes on which the reflective multilayer films 12 and 14 are formed, as in a manner similar to that in the conventional VIPA plate. Note, a dotted line shown in the lower part of FIG. 2 illustrates a locus of the incident light in the conventional VIPA plate, so as to correspond to the VIPA plate 10 in this embodiment.

Optical characteristics of the line focal lens 5 and the concave cylindrical mirror portion 16 are designed so that, by combinations of the characteristics, the light multiple-reflected inside the VIPA plate 10 is condensed on one segment in the vicinity of a position where the light reaches an emission surface (the plane on which the reflective multilayer film 12 is formed) and a desired beam waist $2\omega 0$ can be obtained as described below. Further, in the case where the flat and tilted reflector plate is formed on the bottom surface of the VIPA plate 1 in place of the concave cylindrical mirror portion 16 as discussed above, the optical design is performed so that the condensing condition described above can be obtained only by the optical characteristic of the line focal lens 5.

Every time the WDM light is reflected by the surface of the reflective multilayer film 12 having the reflectance lower than 100%, a few % of the WDM light is transmitted through such a surface, while the WDM light being multiple-reflected by the VIPA plate 1. Then, the light transmitted through the VIPA plate 1 interferes mutually, so that a plurality of optical beams, traveling directions of which are different from each other according to wavelengths, are formed. More specifically, in the example shown on the right side of FIG. 2, an optical beam of the fundamental order short wavelength λ (0S), an optical beam of the fundamental order medium wavelength λ (0M) and an optical beam of the fundamental order long wavelength λ (0L) as well as an optical beam of the +1 st order short wavelength λ (±1 S), an optical beam of the ±1st order medium wavelength λ (±1 M) and an optical beam of the ±1st order long wavelength λ (±1L) are formed, respectively.

The optical beams of respective wavelengths emitted in different directions from the reflective multilayer film 12 of the VIPA plate, are condensed by the convergent lens 6 on different positions on the central axis of the free-form surface mirror 7, to be reflected by the free-form surface mirror 7, respectively. Then, the lights of respective wavelengths reflected by the free-form mirror 7 travel in opposite directions along the optical paths through which the lights have been propagated before reflected, and passes through the convergent lens 6, the VIPA plate 1, the line focal lens 5, the collimate lens 4 and the optical fiber 3 successively, to be output from the third port of the optical circulator 2. As a result, the WDM light input to the present wavelength dispersion compensator, is subjected to the wavelength dispersion compensation by a required amount set according to the position of the free-form surface mirror 7, to be output from the wavelength dispersion compensator.

In the VIPA-type wavelength dispersion compensator as described above, since, in the VIPA plate 1, there is no part corresponding to the conventional radiation window on either of the planes on which the reflective multilayer films 12 and 14 are formed, the HR/AR edge loss never occurs irrespective of the condensing condition of the WDM light given to the VIPA plate 1. Therefore, the trade-off between the HR/AR edge loss and other mode loss in the conventional VIPA plate can be eliminated. Thus, it becomes possible to optimize the condensing condition of the incident light so that other mode loss is reduced.

Figure 3:
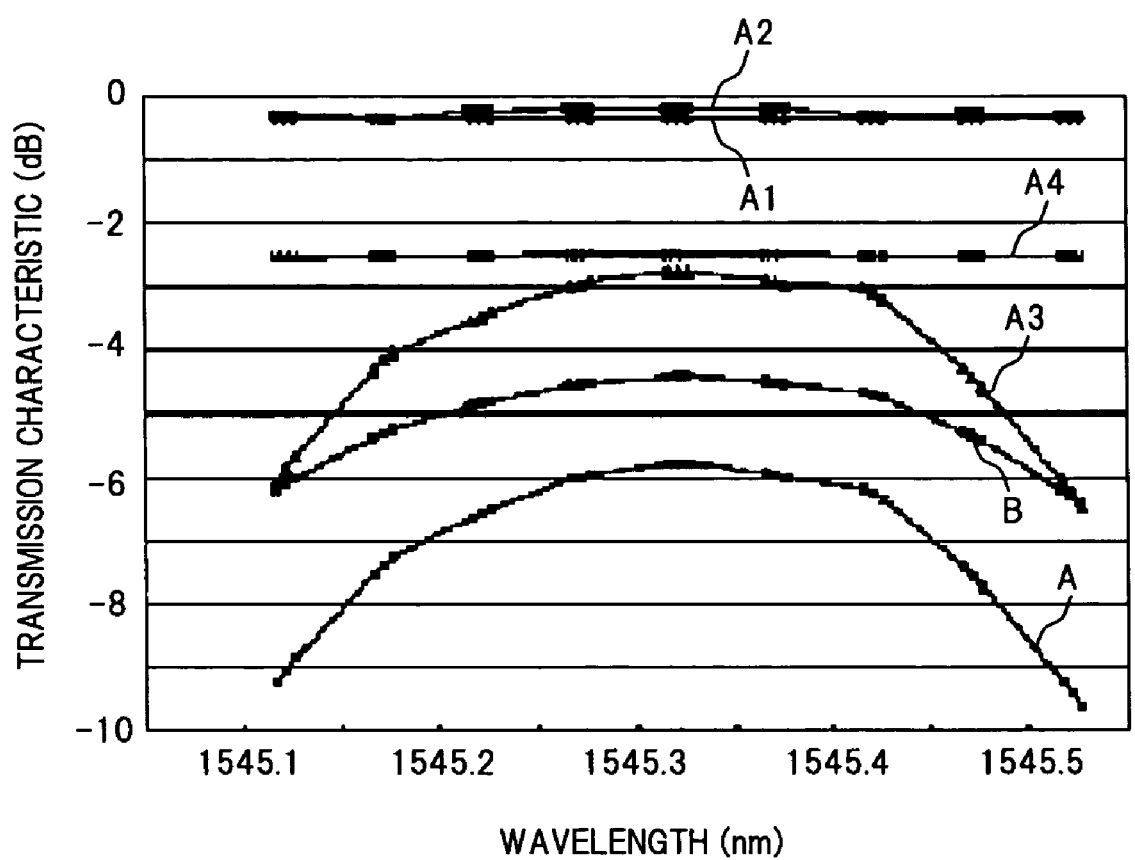
FIG. 3 is a graph for explaining a reduction effect of an insertion loss in the first embodiment.

More specifically, for example, as can be seen from a simulation result of wavelength transmission (loss) characteristics shown in FIG. 3, comparing between a characteristic A obtained in the case where the incident angle θi is set to 3.1°, the thickness of the VIPA plate 1 is set to 800 μm, the refractive index n of the VIPA plate 1 is set to 1.800, the beam waist 2ωo of the incident beam is set to 22 μm, and the divergence angle of the emitted beam θbo is set to 2.57° in the conventional configuration (condition "a"), and a wavelength loss characteristic B obtained in the case where the incident angle θi is set to 2.5°, the thickness of the VIPA plate 1 is set to 800 μm, the refractive index n of the VIPA plate 1 is set to 1.800, the beam waist 2ωo of the incident beam is set to 50 μm, and the divergence angle of the emitted beam θ bo is set to 1.410 in the configuration of this embodiment (condition "b"), it can be understood that an insertion loss in the wavelength dispersion compensator can be reduced by about 1.3 dB or more.

Note, in FIG. 3, a characteristic A1 shows the HR/AR edge loss in the condition "a", a characteristic A2 shows an etalon transmission loss in the condition "a", a characteristic A3 shows other mode loss in the condition "a" and a characteristic A4 shows a mode coupling loss in the condition "a", respectively. The characteristic A corresponding to the insertion loss in the conventional wavelength dispersion compensator is equivalent to the sum of the characteristics A1-A4 described above.

Figure 10:
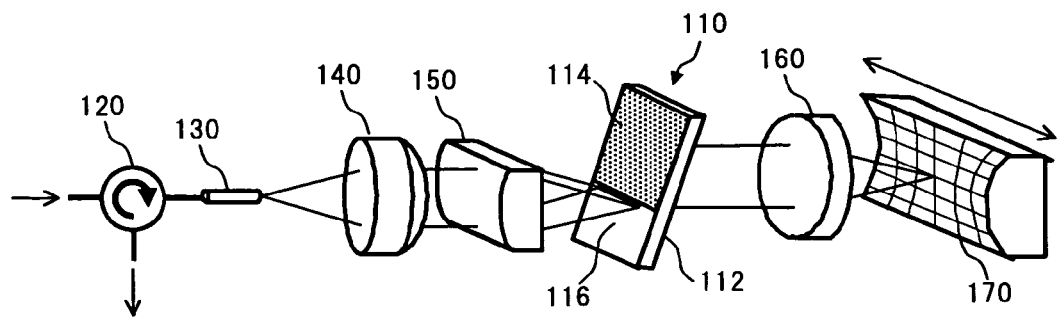
FIG. 10 is a perspective view showing configuration example of a conventional VIPA-type wavelength dispersion compensator.

As described above, according to the wavelength dispersion compensator of the first embodiment, since the incident light is given from the side surface 10A to the VIPA plate 1 and is reflected by the concave cylindrical mirror portion 16 formed on the opposite side surface, to cause the multiple reflection between the parallel planes, the insertion loss can be reduced effectively thereby capable of improving the characteristic of the wavelength dispersion compensator. Further, since it is no longer needed to arrange the optical components constituting the optical system in a substantially straight line, the size (module length) of the wavelength dispersion compensator in the longitudinal direction can be reduced in comparison with the conventional VIPA-type wavelength dispersion compensator (FIG. 10).

Next, a second embodiment of the present invention will be described.

Figure 4:
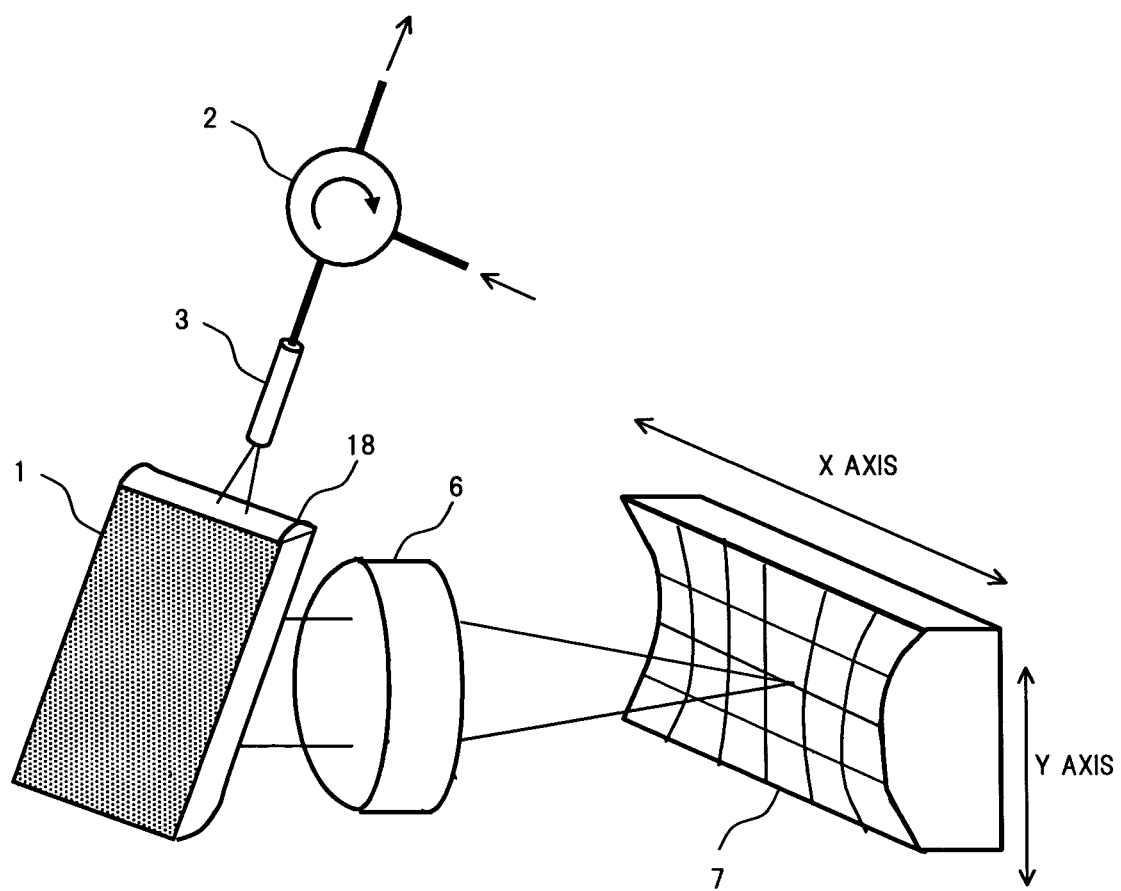
FIG. 4 is a perspective view showing an entire configuration of a second embodiment of the present invention.
Figure 5:
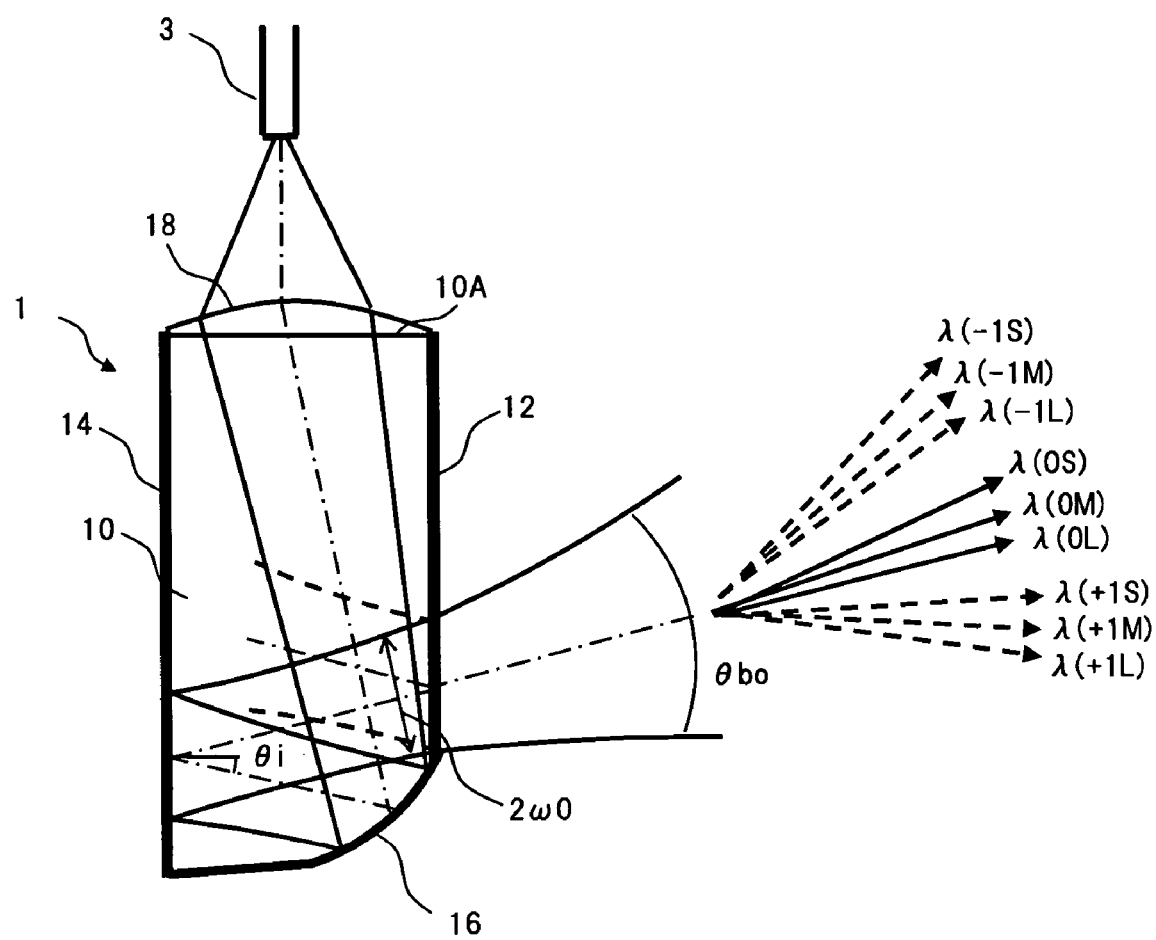
FIG. 5 is a side cross section view showing a configuration around a VIPA plate in FIG. 4 in an enlarged manner.

FIG. 4 is a perspective view showing an entire configuration of a wavelength dispersion compensator according to the second embodiment. Further, FIG. 5 is a side cross section view showing a configuration around a VIPA plate in FIG. 4, in an enlarged manner.

In each figure, the configuration of the wavelength dispersion compensator of this embodiment differs from that of the first embodiment described above in that a bifocal lens 18 is formed on the side surface 10A of the VIPA plate 1 in place of the collimate lens 4 and the line focal lens 5 used in the first embodiment. The configurations of parts other than the above are similar to those in the first embodiment, and the description thereof is omitted.

Figure 6:
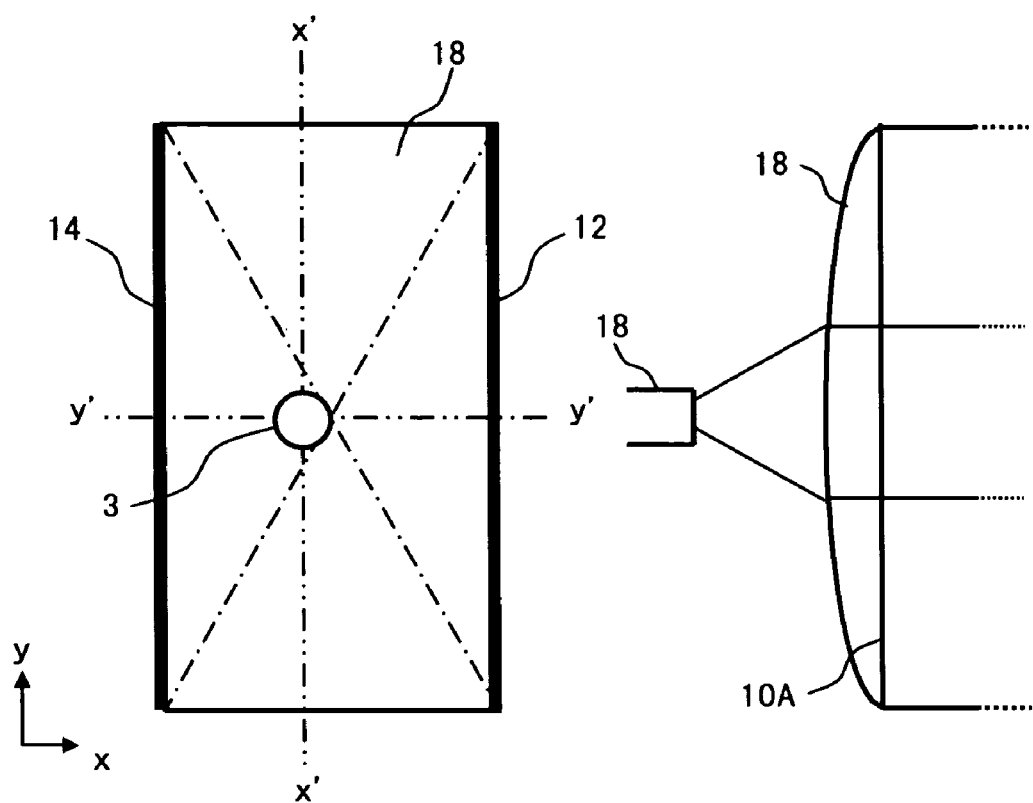
FIG. 6 is a diagram for explaining a relative arrangement of a bifocal lens and an optical fiber in the second embodiment.
Figure 6:
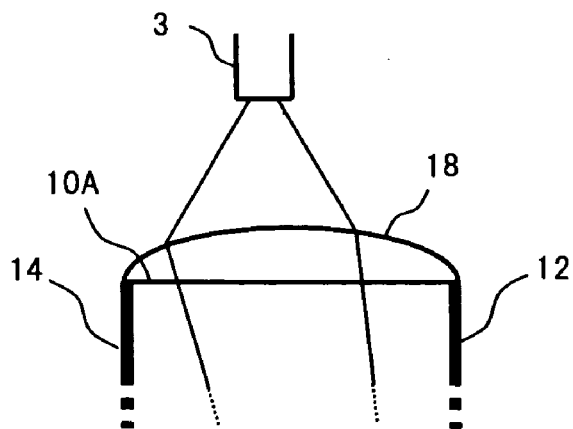

As can be seen from an enlarged view shown in FIG. 6, for example, the bifocal lens 18 is a known lens designed so that focal lengths of the orthogonal x- and y-axes are different from each other, and as a specific example, it may be a bifocal cylindrical lens or the like. This bifocal lens 18 is formed on the side surface 10A of the VIPA plate 1 and has a relative positional relation to the optical fiber 3 disposed in the vicinity thereof is such that, as shown in a top view in FIG. 6, the central axis of the optical fiber 3 is offset from the center (intersecting point of the diagonal lines) of the bifocal lens 18, in more detail, so that the central axis of the optical fiber 3 is arranged at a position that is offset from the center of the bifocal lens 18 in the x-axis direction perpendicular to the parallel planes of the VIPA plate 1. According to this positional relationship, the light incident between the parallel planes of the VIPA plate 1 becomes a parallel light in the y-axis direction along the parallel planes of the VIPA plate 1 as shown in the x'-x' cross section view in FIG. 6 and, on the other hand, converges with a required focal length in the x-axis direction as shown in the y'-y' cross section view in FIG. 6. As can be seen from loci shown by solid curves in FIG. 5, the incident light in such condensing condition passes between the parallel planes to be reflected by the concave cylindrical mirror portion 16 toward the reflective multilayer film 14, and thereafter, is multiple-reflected between the parallel planes on which the reflective multilayer films 12 and 14 are formed, in a manner similar to that in the first embodiment.

As described above, even when the bifocal lens 18 is formed on the side surface 10A of the VIPA plate 1 on which the WDM light is incident from the optical fiber 3, an effect similar to that in the first embodiment can also be obtained and, further, since the arrangement of a plurality of lenses between the VIPA plate 1 and the optical fiber 3 is no longer needed, an assembly operation can be simplified and the cost can be reduced.

Note, in the first and second embodiments described above, the description has been made on the wavelength dispersion compensator in which the optical beams of respective wavelengths emitted from one of the parallel planes of the VIPA plate 1 and condensed by the convergent lens 6 are reflected by the free-form surface mirror 7, to be returned toward the VIPA plate 1, so that the wavelength dispersion is compensated. However, the usage of the present invention is not limited to the wavelength dispersion compensator. For example, in the configuration of the first and second embodiments, if the free-form surface mirror 7 is replaced by a fiber array in which a plurality of optical fibers are arranged, since the optical beams that are demultiplexed for each wavelength can be guided to each optical fiber, it is also possible to constitute a VIPA-type wavelength demultiplexer.

Next, a third embodiment of the present invention will be described.

Figure 7:
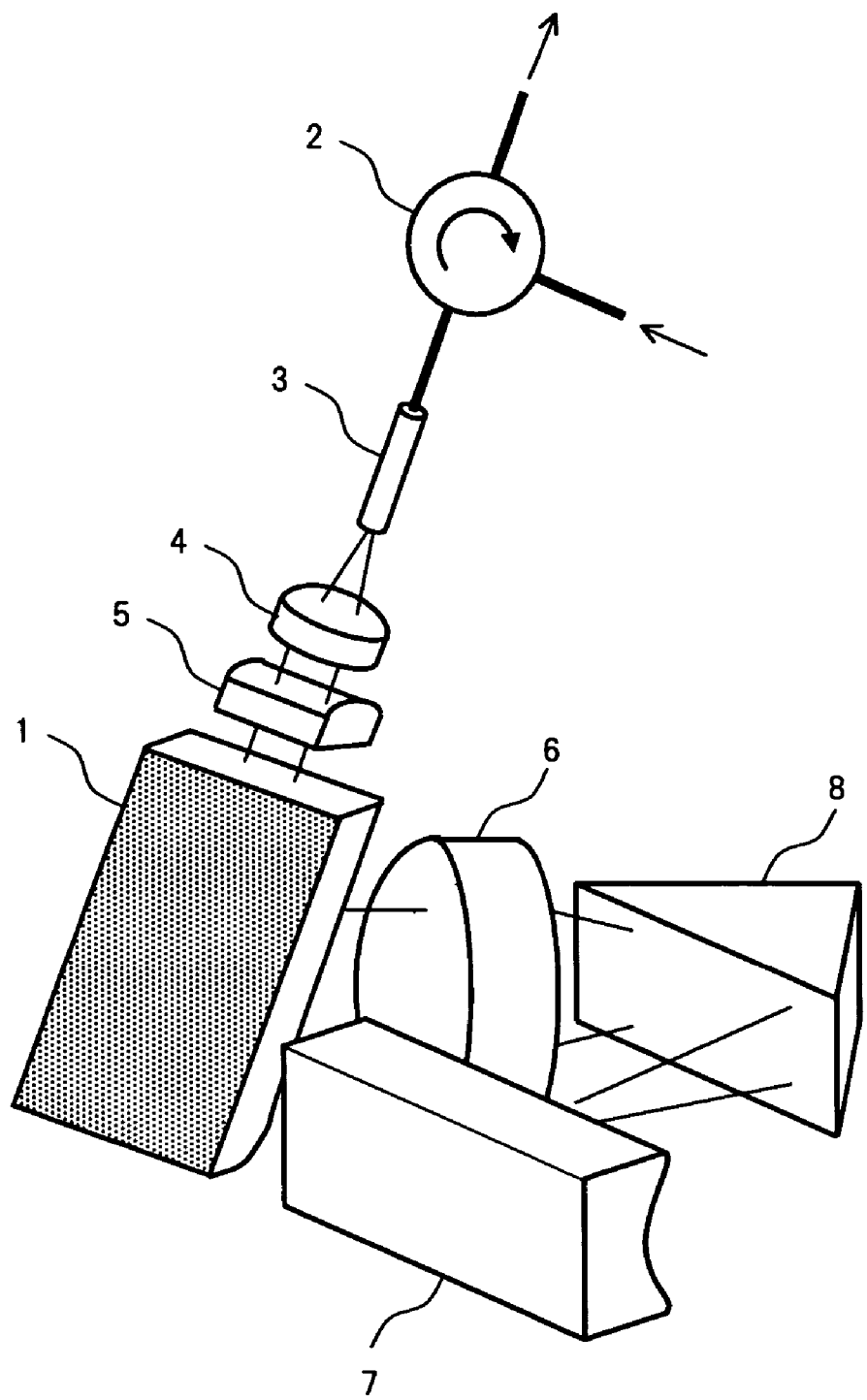
FIG. 7 is a perspective view showing an entire configuration of a third embodiment of the present invention.

FIG. 7 is a perspective view showing an entire configuration of a wavelength dispersion compensator according to the third embodiment.

In FIG. 7, the configuration of the wavelength dispersion compensator of this embodiment differs from that of the first embodiment described above in that a reflection prism 8 is inserted on the optical path between the plane of the VIPA plate 1, from which the multiple-reflected light is emitted, and the free-form surface mirror 7, to further reduce the module length. The configurations of parts other than the above are similar to those in the first embodiment, and the description thereof is omitted.

The reflection prism 8 reflects the lights incident on a hypotenuse surface of a right triangle by other two side surfaces, to emit from the hypotenuse surface, the lights, propagation directions of which are folded back by 180° from the propagation directions of the incident lights. Here, this reflection prism 8 is arranged between the convergent lens 6 and the free-form surface mirror 7. However, the arrangement of the reflection prism 8 is not limited to that described above and, for example, it may be arranged between the VIPA plate 1 and the convergent lens 6.

Figure 8:
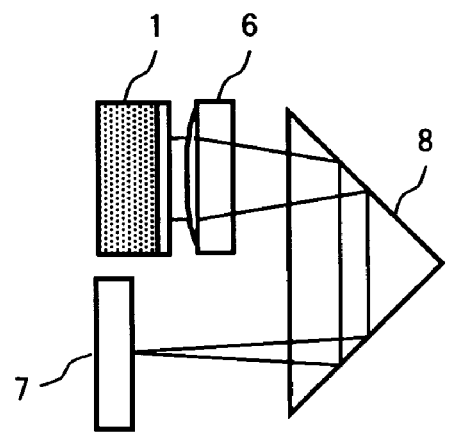
FIG. 8 is a top view of the entire configuration of FIG. 7.

In the configuration described above, as can be seen from loci shown by solid lines in the top view in FIG. 8, the lights of respective wavelengths, which are emitted from the VIPA plate 1 and condensed by the convergent lens 6 in a manner similar to that in the first embodiment described above, are incident on the hypotenuse surface of the reflection prism 8 and then, the propagation directions thereof are folded back. The lights of the respective wavelengths emitted from the hypotenuse surface of the reflection prism 8 are condensed on different positions on the central axis of the free-form surface mirror 7 to be reflected by the free-form surface mirror 7. The lights reflected by the free-form surface mirror 7 are again incident on the hypotenuse surface of the reflection prism 8 and the propagation directions thereof are folded back, and the lights are propagated over the original optical paths in the opposite directions in a manner similar to that in the first embodiment. Note, in the top view in FIG. 8, for the purpose of easily viewing, the optical system (the optical circulator 2, the optical fiber 3, the collimate lens 4 and the line focal lens 5) for inputting/outputting the WDM light to/from the side surface 10A of the VIPA plate 1 is not shown.

As described above, according to the wavelength dispersion compensator of the third embodiment, by applying the optical system utilizing the reflection prism 8, the longitudinal size (the module length) can be reduced to about ½ times. Although the transverse size of the wavelength dispersion compensator is increased by about 1.2 times since the optical path is folded back in the transverse direction (the horizontal direction in FIG. 7) by the reflection prism 8, this increase in the transverse size is negligible in comparison with the effect due to the reduction of the longitudinal size and, therefore, it becomes possible to further downsize the wavelength dispersion compensator.

Note, in the third embodiment described above, the optical system is arranged so that the optical path is folded back by the reflection prism 8 in the transverse direction. However, for example, the reflection prism 8 may be rotated by 90° about the optical axis of the light incident on the hypotenuse surface so that the optical path is folded back in the longitudinal direction (the vertical direction in FIG. 7), and the direction in which the optical path is folded back can be set arbitrarily.

Figure 9:
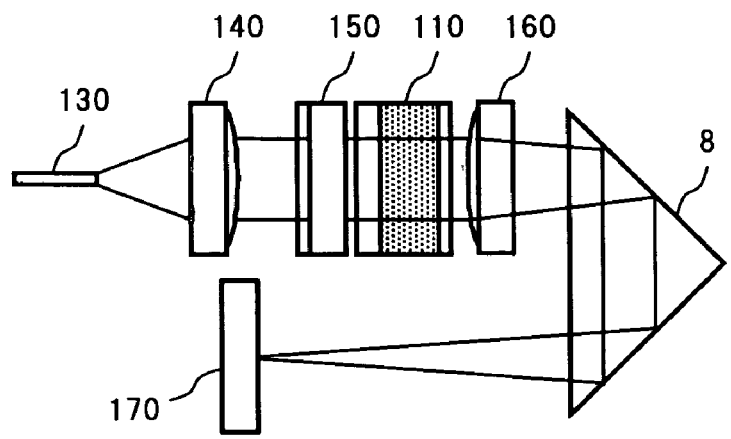
FIG. 9 is a top view showing another configuration example related to the third embodiment.
Figure 11:
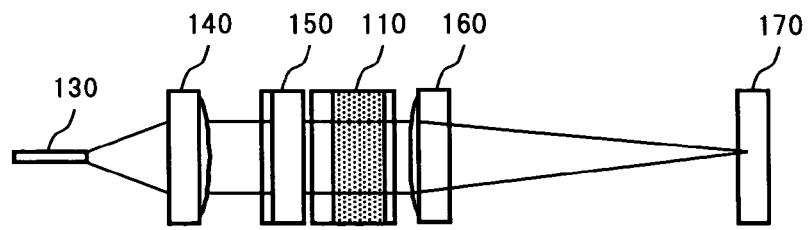
FIG. 11 is a top view of the configuration example of FIG. 10.
Figure 12:
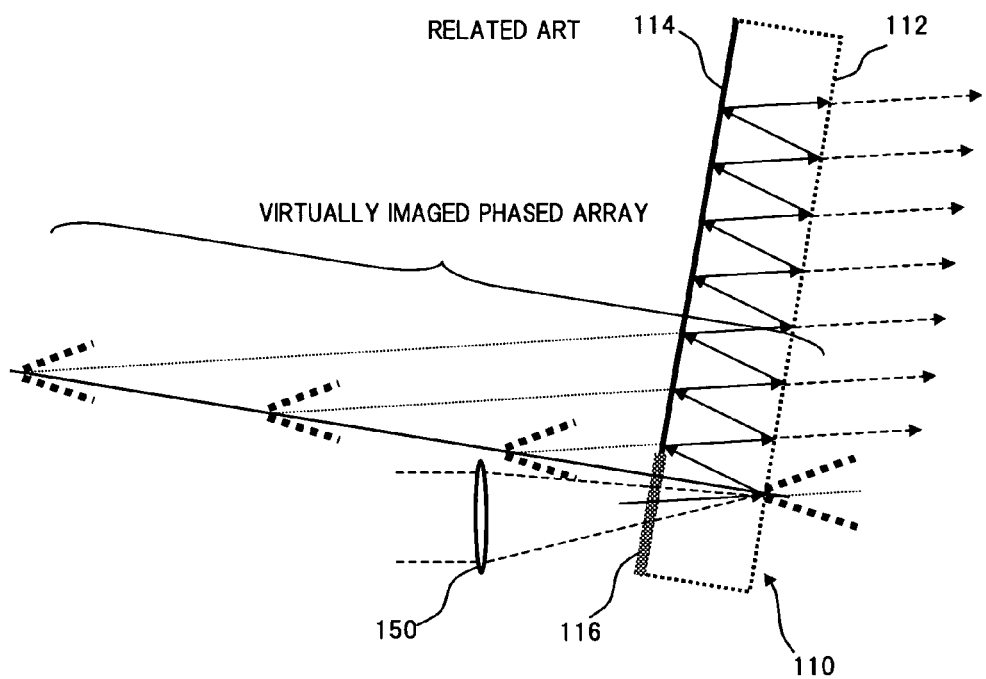
FIG. 12 is a diagram showing a model for explaining an operation theory of the conventional VIPA.
Figure 13:
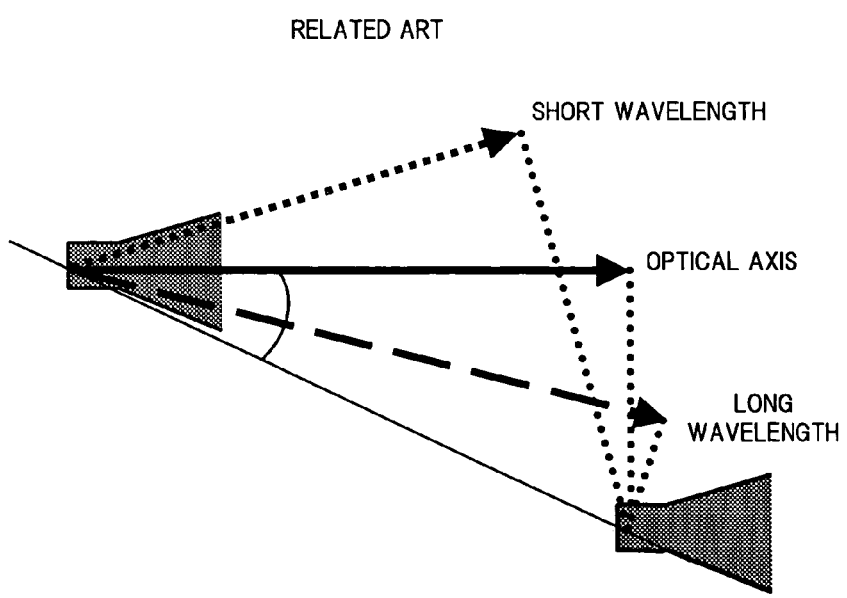
FIG. 13 is a diagram showing a model for explaining an interference condition in the conventional VIPA.
Figure 14:
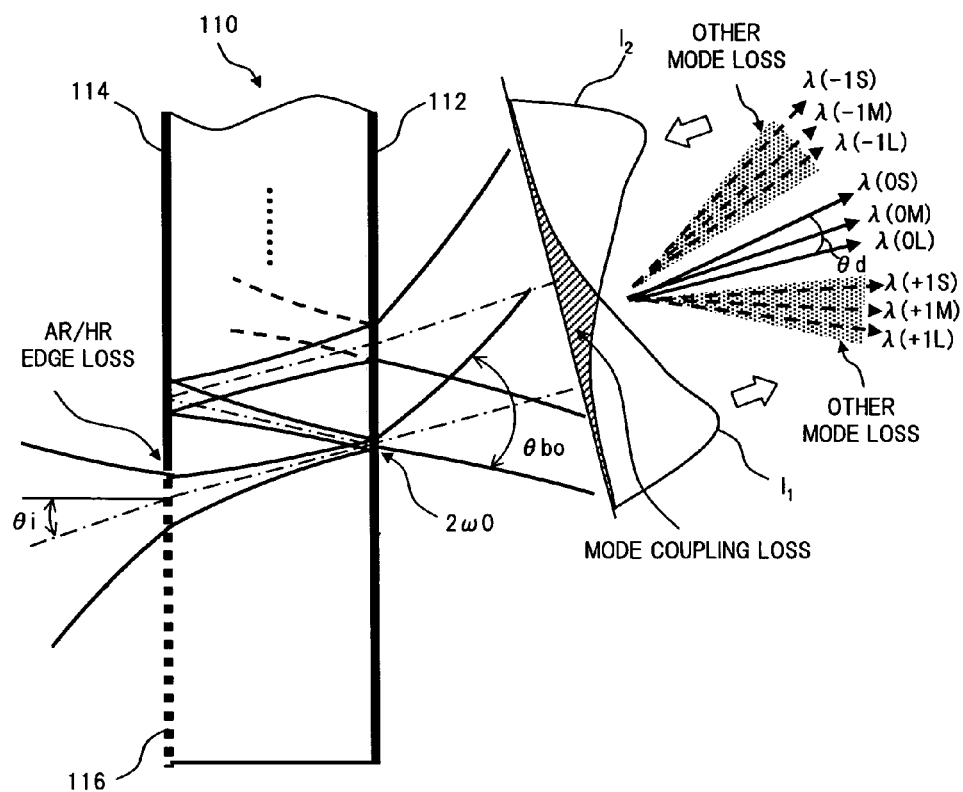
FIG. 14 is a diagram for explaining an insertion loss occurring when a beam waist of incident light is narrowed in the conventional VIPA.
Figure 15:
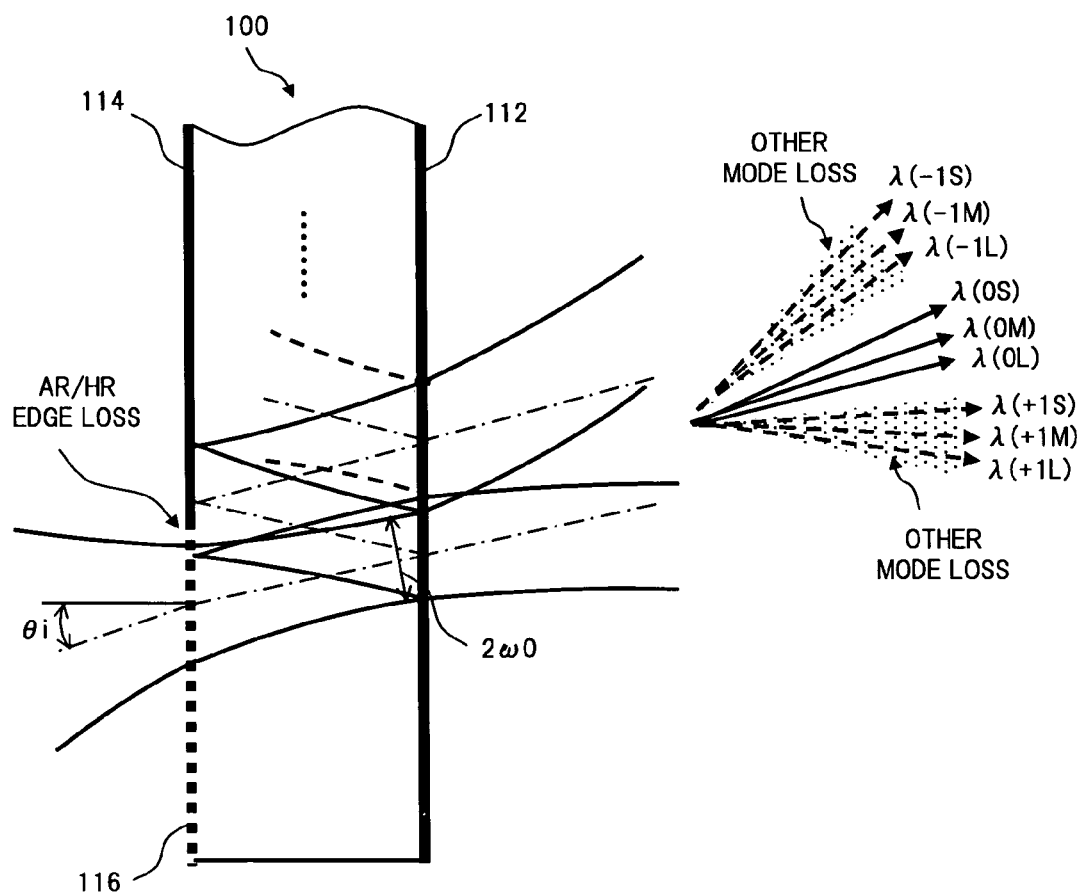
FIG. 15 is a diagram for explaining an insertion loss occurring when the beam waist of the incident light is thickened in the conventional VIPA.

Still further, although the example in which the optical system using the reflection prism 8 is applied to the configuration of the first embodiment has been shown, such an optical system may also be applied to the configuration of the second embodiment similarly. Further, the optical system using the reflection prism 8 is also effective for downsizing the conventional VIPA-type wavelength dispersion compensator as shown in FIGS. 10 and 11 described above. A configuration example shown in FIG. 9 is a top view in the case where the optical system using the reflection prism 8 is applied to the conventional VIPA-type wavelength dispersion compensator.

What is claimed is:

1. An optical component including a device having two reflective surfaces which are opposed and parallel to each other, and provided with a demultiplexing function in which a light condensed in the one-dimensional direction is incident between the two reflective surfaces of said device, and a part of said incident light is transmitted through one of the two reflective surfaces while said incident light being multiple-reflected on the reflective surfaces, to be emitted, and said emitted light interferes mutually, so that optical beams, traveling directions of which are different from each other according to wavelengths, are formed, wherein said device includes: a first side surface substantially perpendicular to each of the reflective surfaces; and a second side surface opposed to said first side surface and tilted relative to a direction perpendicular to the two respective reflective surfaces, and said incident light is transmitted through said first side surfaces, and then, the transmitted light passes between the reflective surfaces to thereby be reflected by said second side surface, and the light reflected by said second side surface is multiple-reflected on the two respective reflective surfaces followed by being outputted from one of the two reflective surfaces, and then said outputted light is transmitted in a direction tilted toward said first side surface relative to a direction perpendicular to said one of the two reflective surfaces.

2. An optical component according to claim 1,
wherein a mirror portion having a reflective surface shaped so that the reflected light can be condensed in the one-dimensional direction is formed on at least a part of said second side surface.

3. An optical component according to claim 1,
wherein a flat plate mirror that is tilted relative to a perpendicular direction of said reflective surfaces is formed on said second side surface.

4. An optical component according to claim 1, further including; a first optical system giving the light condensed in the one-dimensional direction to the first side surface of said device.

5. An optical component according to claim 4,
wherein said first optical system includes: a collimate lens converting a light emitted from an optical fiber into a parallel light; and a line focal lens condensing the parallel light converted by said collimate lens in the one-dimensional direction, and the light emitted from said line focal lens is given to the first side surface of said device.

6. An optical component according to claim 4,
wherein said first optical system includes a bifocal lens in which focal lengths of orthogonal axes are different from each other, and said bifocal lens is formed on the first side surface of said device, and a light emitted from an optical fiber is given to the first side surface of said device via said bifocal lens.

7. An optical component according to claim 1, further including a second optical system condensing optical beams of respective wavelengths emitted from one of the reflective surfaces of said device in different directions, respectively, on different positions.

8. A wavelength dispersion compensator, comprising:
an optical component including a device having two reflective surfaces which are opposed and parallel to each other, and provided with a demultiplexing function in which a light condensed in the one-dimensional direction is incident between the two reflective surfaces of said device, and a part of said incident light is transmitted through one of the two reflective surfaces while said incident light being multiple-reflected on the reflective surfaces, to be emitted, and said emitted light interferes mutually, so that optical beams, traveling directions of which are different from each other according to wavelengths, are formed; and a reflector reflecting optical beams of respective wavelengths emitted from one of the reflective surfaces of said optical component in different directions to thereby return the optical beams to said optical component, respectively, wherein in said optical component, said device includes: a first side surface substantially perpendicular to each of the reflective surfaces; and a second side surface opposed to said first side surface and tilted relative to a direction perpendicular to the two respective reflective surfaces, and said incident light is transmitted through said first side surface, and then, the transmitted light passes between the reflective surfaces to be reflected by said second side surface, and the light reflected by said second side surface is multiple-reflected on the two respective reflective surfaces followed by being outputted from one of the two reflective surfaces, and then said outputted light is transmitted in a direction tilted toward said first side surface relative to a direction perpendicular to said one of the two reflective surfaces.

9. A wavelength dispersion compensator according to claim 8, further comprising:
a first optical system giving the light condensed in the one-dimensional direction to said optical component; and
a second optical system condensing optical beams of respective wavelengths emitted from one of the reflective surfaces of said optical component in different directions, respectively, on different positions on a reflective surface of said reflector.

10. The wavelength dispersion compensator according to claim 8,
wherein a reflection prism for changing a propagation direction of light to an opposite direction is provided on an optical path between one of the reflective surfaces of said optical component and said reflector.

* * * * *

UNITED STATES PATENT AND TRADEMARK OFFICE
CERTIFICATE OF CORRECTION

PATENT NO. : 7,302,189 B2　　　　　　　　　　　　　　　　　　　　　　　Page 1 of 1
APPLICATION NO. : 10/790356
DATED : November 27, 2007
INVENTOR(S) : Yuichi Kawahata It is certified that error appears in the above-identified patent and that said Letters Patent is hereby corrected as shown below:

Column 10, Line 59, change "surfaces," to --surface,--.

Signed and Sealed this

Sixth Day of May, 2008

JON W. DUDAS
*Director of the United States Patent and Trademark Office*